A. E. COOK & T. VAN TUYL.
CONVERTIBLE INTERNAL COMBUSTION ENGINE.
APPLICATION FILED AUG. 31, 1912.
1,213,840.
Patented Jan. 30, 1917.
6 SHEETS—SHEET 5.
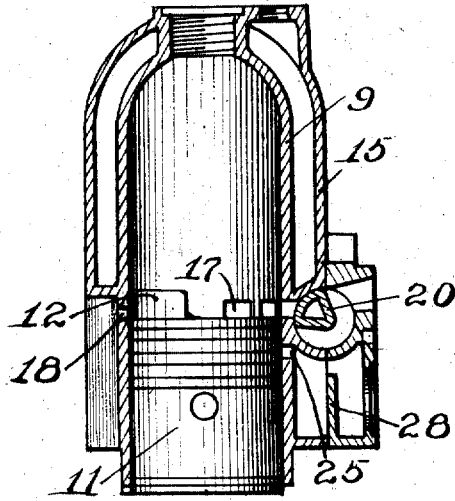
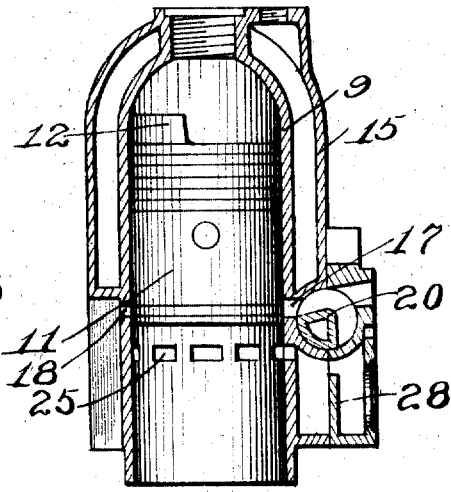
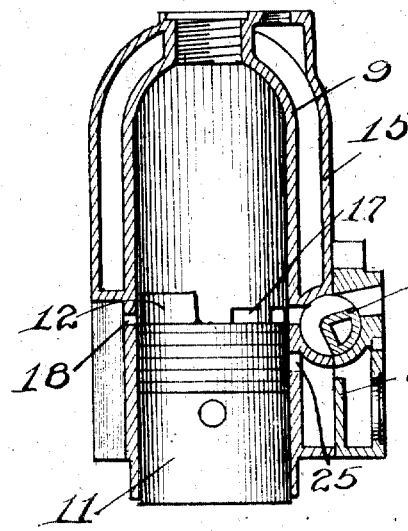
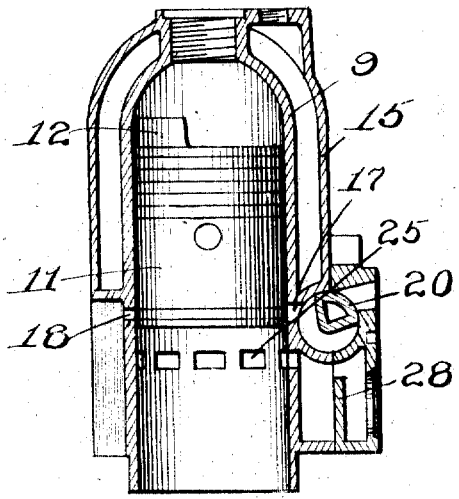

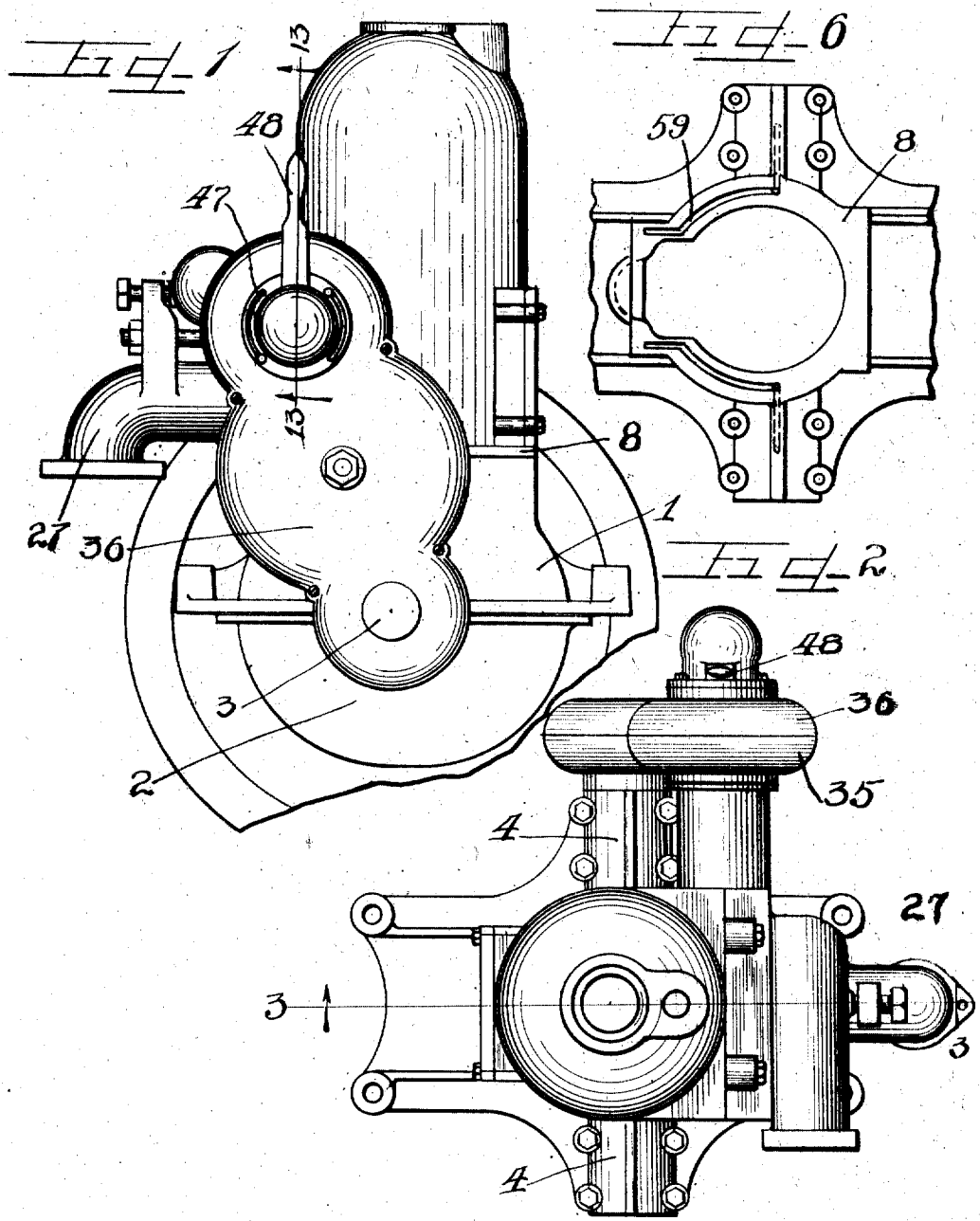

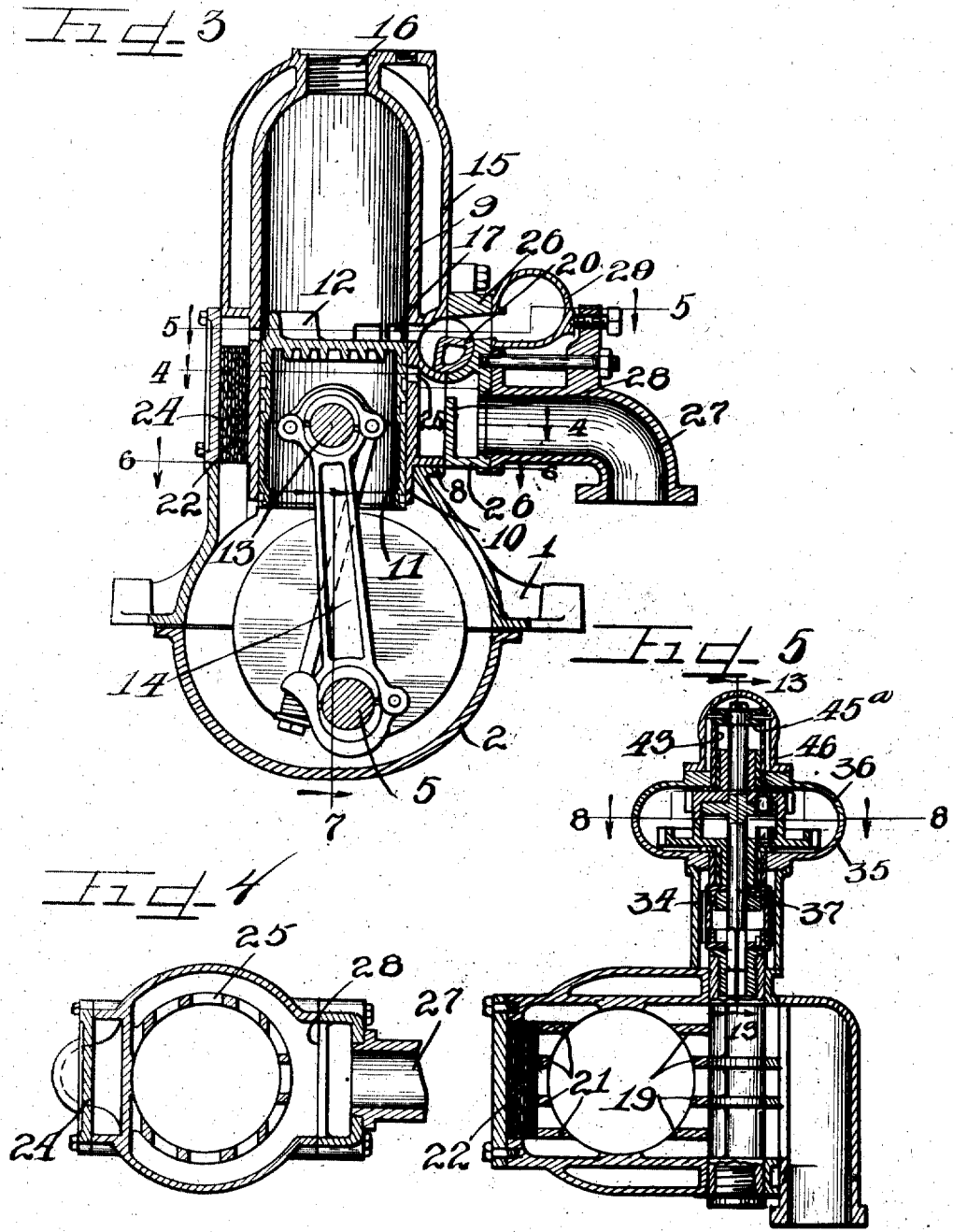

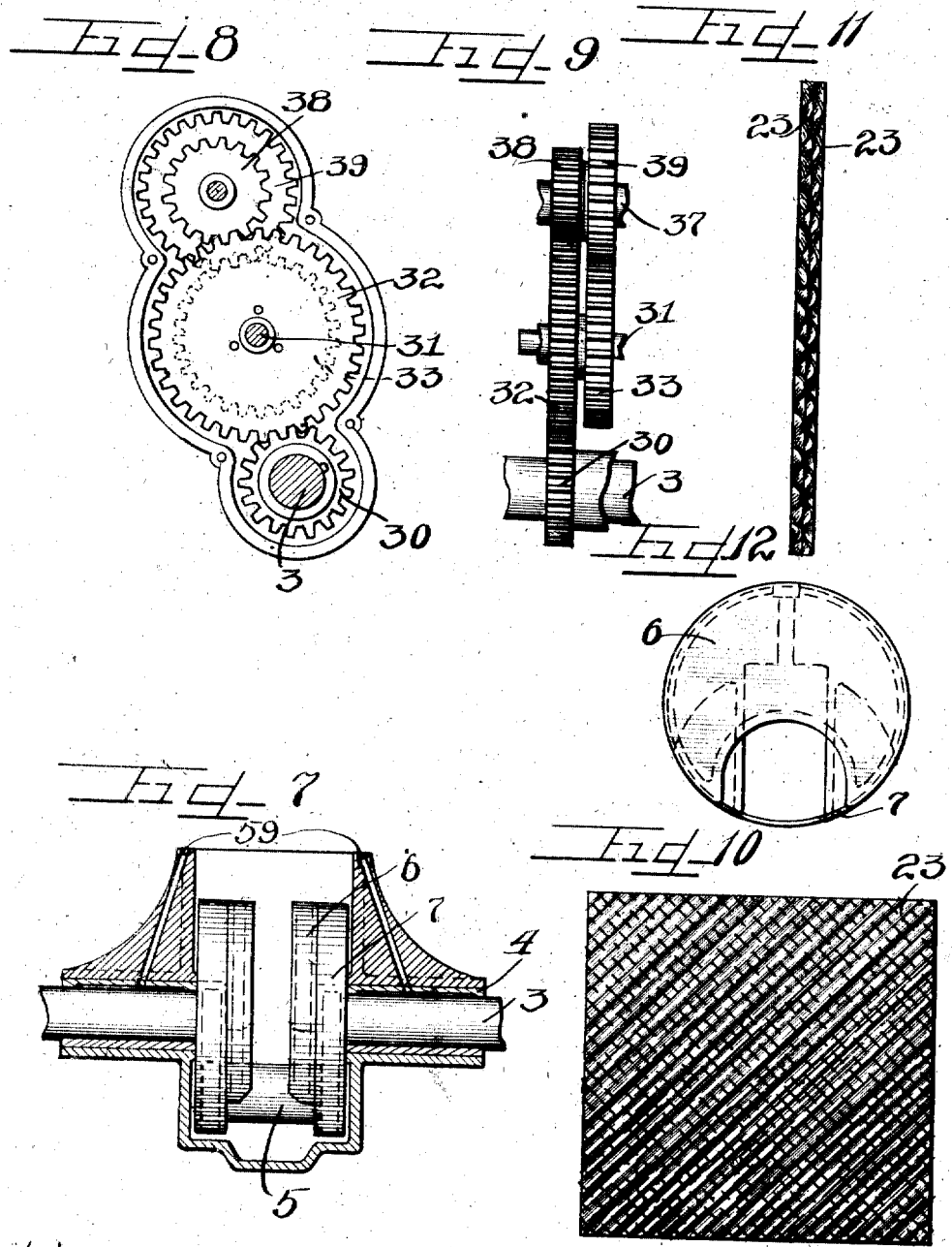

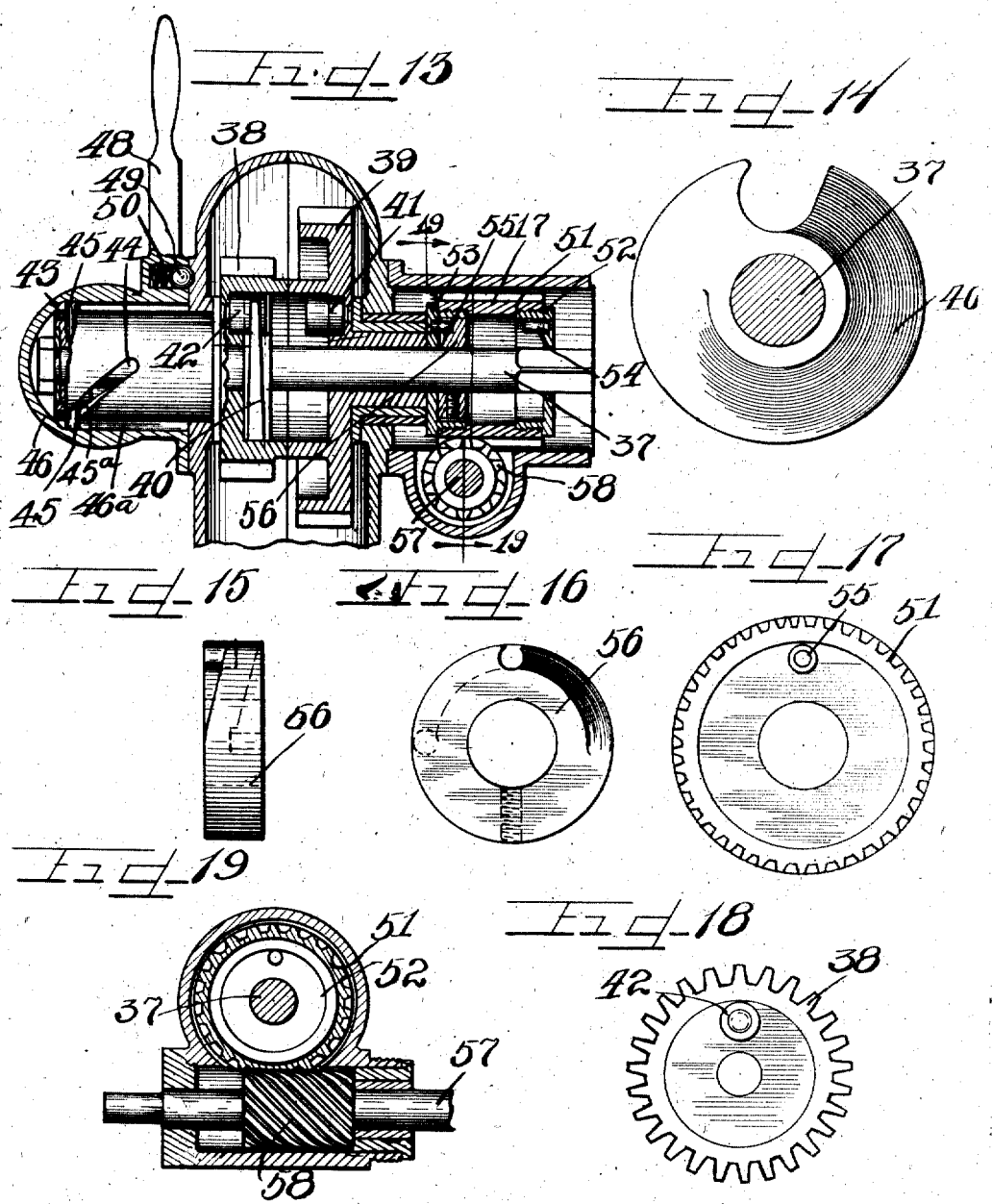

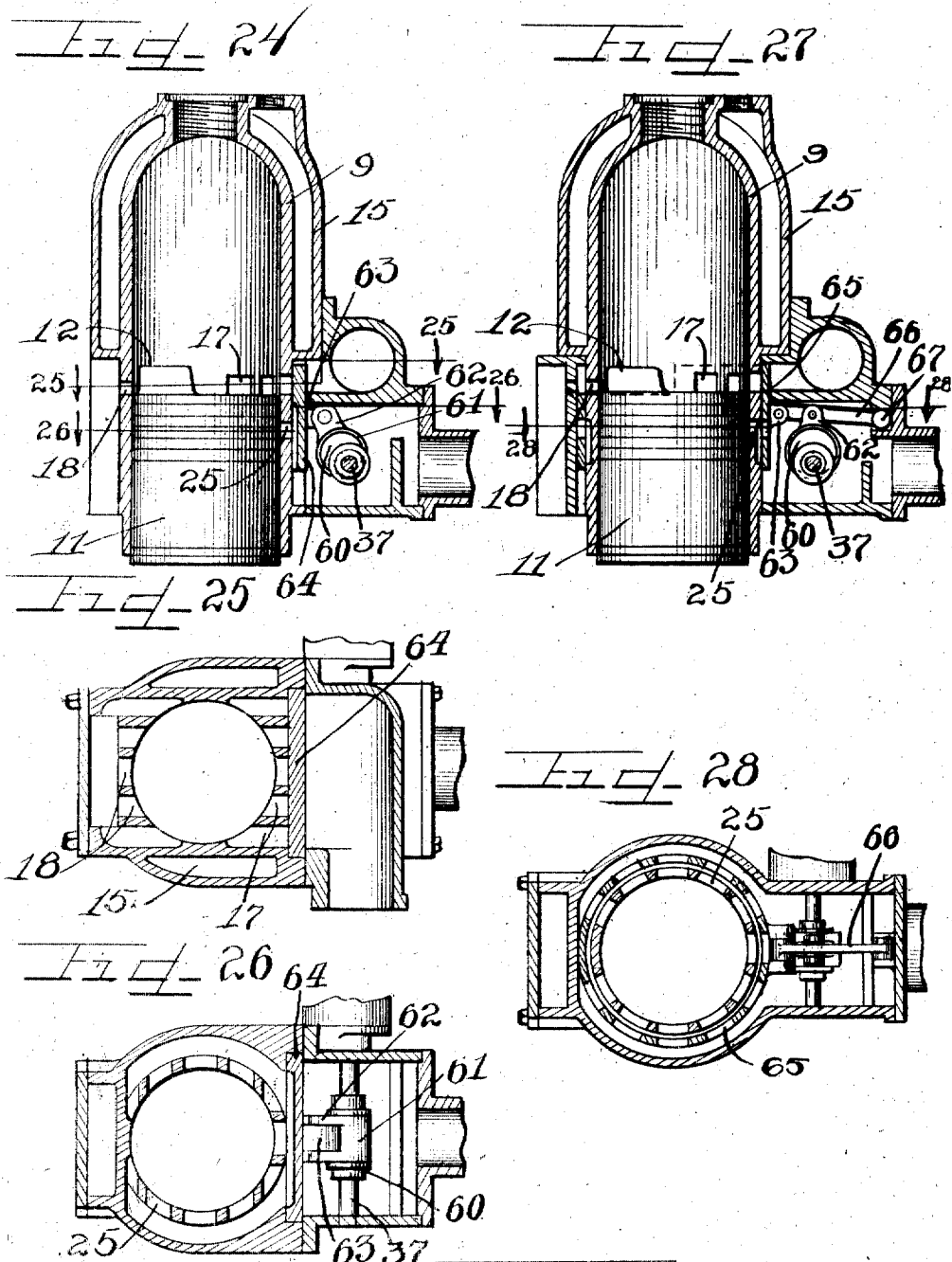

UNITED STATES PATENT OFFICE.

ALBERT E. COOK, OF ODEBOLT, IOWA, AND THOMAS VAN TUYL, OF KANKAKEE, ILLINOIS; SAID VAN TUYL ASSIGNOR TO SAID COOK.

CONVERTIBLE INTERNAL-COMBUSTION ENGINE.

1,213,840.      Specification of Letters Patent.      Patented Jan. 30, 1917.

Application filed August 31, 1912. Serial No. 718,029.

*To all whom it may concern:*

Be it known that we, ALBERT E. COOK and THOMAS VAN TUYL, citizens of the United States, and residents of the town of Odebolt, in the county of Sac and State of Iowa, and Kankakee, Kankakee county, Illinois, respectively, have invented certain new and useful Improvements in Convertible Internal-Combustion Engines; and we do hereby declare that the following is a full, clear, and exact description of the same, reference being had to the accompanying drawings, and to the numbers of reference marked thereon, which form a part of this specification.

Applicants' Patent No. 1,180,478 for a "mixing and purifying device," constituting a division of this application, issued April 25th, 1916.

Internal combustion engines of the so-called 2-cycle or 2-stroke type and of the 4-cycle or 4-stroke type have come into general and extensive use, each type having its characteristic advantages and being quite generally preferred for certain uses, and each possessing to some degree objectionable characteristics for other uses.

The object of this invention is to construct a convertible internal combustion engine of the 2-cycle or 2-stroke type adapted when desired by the operator to be operated as a 4-cycle or 4-stroke engine, without the necessity of stopping the operation of the engine to effect the conversion from the one to the other type of engine.

It is a further object of the invention to afford a construction whereby the compression attainable within the cylinder of an engine of the 2-cycle or 2-stroke type is augmented, by admitting a second charge of mixture into the cylinder and compressing the same prior to the ignition, the ignition occurring in sequence as in 4-cycle or 4-stroke engines.

It is an object of the invention to afford what may be termed a valveless engine of the 2-cycle type, adapted for conversion to the 4-cycle type by use of a single valve.

It is an object of the invention also to thoroughly mix the ingredients of the charge before admission to the cylinder, and to completely vaporize the hydrocarbon constituent of said charge before admission into the cylinder, and to deliver the same into the cylinder at a temperature above that of the mixture in the crank case or other compression chamber.

The invention is illustrated in the drawings as embodied in an engine having but a single cylinder, though adapted for use in engines having any number of cylinders.

The invention in a preferred form, except as to the number of cylinders, which may of course vary, is illustrated in the drawings, and hereinafter more fully described.

In the drawings: Figure 1 is a view in side elevation of a device embodying our invention. Fig. 2 is a top plan view thereof, showing same turned half way around. Fig. 3 is a section taken on line 3—3 of Fig. 2. Fig. 4 is a fragmentary section taken on line 4—4 of Fig. 3, with parts omitted. Fig. 5 is a section taken on line 5—5 of Fig. 3 with parts omitted. Fig. 6 is a fragmentary top plan view of the crank case, substantially on line 6—6 of Fig. 3. Fig. 7 is a sectional view of the crank case, taken on line 7—7 of Fig. 3, but with the crank shaft in elevation. Fig. 8 is a section on line 8—8 of Fig. 5. Fig. 9 is a detailed view of the gear train with the casing therefor removed. Fig. 10 is a view in elevation of the vaporizer and oil separator, showing the same removed from the engine. Fig. 11 is an edge view thereof. Fig. 12 is an inner face view of one of the counterbalancing members or junk plates for the crank. Fig. 13 is an enlarged sectional view on line 13—13 of Fig. 1. Fig. 14 is an enlarged face view of one member of the cam and clutch whereby the conversion from the 2-stroke to the 4-stroke type of engine is effected. Fig. 15 is an enlarged edge view of the cam clutch for varying the timing of the magneto or sparking device. Fig. 16 is a face view of the cam clutch member illustrated in Fig. 15. Fig. 17 is an enlarged section taken through the worm gear shown in Fig. 13. Fig. 18 is an inner face view of the upper outer gear of the gear train. Fig. 19 is a section taken on line 19—19 of Fig. 13, showing the worm gear and worm for driving the magneto, in elevation. Figs. 20 to 23, inclusive, are central vertical sections of the cylinder, showing the piston in elevation and illustrating the operation or cycles of the engine. Fig. 24 is a view in vertical section illustrating the use of a slide valve instead of a rotary valve. Fig. 25 is a section on line 25—25 of Fig. 24. Fig. 26 is a section on line 26—26 of Fig. 24. Fig. 27 is a view similar to Fig. 24, but illustrating the use of a sleeve valve. Fig. 28 is a section on line 28—28 of Fig. 27.

As shown in the drawings: 1 indicates the base or upper portion of the crank case of the engine; 2 the bottom portion of the crank case, which is secured thereto, as is usual, or in any suitable manner, said crank case in the construction shown serving also as a compression chamber. The joint between the parts affording the crank case is of course gasketed. Each of said parts also is provided with laterally directed complemental extensions 4 cored to afford the journal boxes or bearings for the crank shaft 3, and as shown a brass, bronze, or other suitable bearing sleeve is provided in each of said boxes to afford a tight and suitable anti-friction bearing for said shaft. The crank 5 on said crank shaft is constructed as usual, and secured thereon to counterbalance the crank are counterbalancing plates 6, one on each side of the center of the crank, and fitting thereover as shown in Fig. 7. Said counterbalancing or junk plates are cored on the outer side to fit over the crank arm and to lie close against the wall of the crank case, and on the inner side are shaped to fit to the crank pin. Said junk plates are retained in place by means of a steel or other suitable metallic band 7, which extends around the same to clamp the same in place. The said counterbalancing plates may be cored on either side to receive counterbalancing weights in a familiar manner.

The upper face of the crank case 1 is faced off and provided with an outwardly directed flange 8, to afford attachments for the cylinder 9, which is bolted or otherwise rigidly secured thereon, and the inner end 10 of which extends into the top of the crank case as shown in Fig. 3. Slidably engaged in said cylinder is the piston 11, provided with suitable piston rings, and constructed generally as usual with the pistons of 2-cycle engines, i. e., an upwardly projecting flange or deflecting lip 12 is provided on the head thereof near the periphery and adjacent the inlet ports for the cylinder. Said piston is provided with the usual piston pin 13, whereby the same is connected by means of the connecting rod 14 with the crank pin 5.

As shown, the cylinder is provided with an outer casing 15, affording an interior water jacket to cool the cylinder, and is provided with a threaded opening 16 at the top thereof to receive the spark plug or other ignition device for the cylinder. Opening outwardly through the wall of said cylinder on one side thereof are a plurality of exhaust port openings, 17, which are relatively wide longitudinally of the cylinder, and the bottoms of which extend substantially to the top of the piston at the limit of its power stroke, so that said exhaust ports are fully open when the piston is at the limit of its power stroke. At the opposite side of the cylinder are a plurality of inlet port openings 18. These are of less width vertically of the cylinder than the exhaust ports, and the bottoms thereof also extend to a point substantially coincident in said cylinder with the limit of the power stroke of the piston. The upper portions of the exhaust ports lie above the inlet ports sufficiently to permit nearly full exhaust from the cylinder before said inlet ports are opened on the power stroke of the piston.

The lower end of the cylinder below the water jacket is provided on the exhaust side thereof with outwardly directed parallel ribs 19, arranged between the adjacent ports, and integral with the cylinder, and is also provided with a transverse bore to receive the rotary valve 20, which serves as an exhaust valve. The opposite side of the cylinder, as shown in Fig. 5, is also provided with parallel ribs 21, arranged between adjacent inlet ports, and extending outwardly from the wall of the cylinder, so that the outer edges thereof are substantially flush and bearing against the same, and lying below the inlet ports is the vaporizer and mixer and oil separator 22, comprising, as shown, a plurality of diagonally corrugated rectangular plates 23, which are arranged face to face in contact with the corrugations arranged at right angles with each other as indicated in Figs. 10 and 11, the dotted lines in Fig. 10 indicating the direction of the corrugations on the next succeeding plate. Said plates affording said vaporizer and separator fit closely in the chamber or by-pass provided therefor, as shown in Fig. 3, and, as shown, a closing or covering plate 24 is secured by bolting or otherwise on the outer side of the cylinder to afford a tight joint. Said chamber is at all times in open communication with the crank case, as shown in Fig. 3. Inlet ports 25 to the crank case are provided through said cylinder, said ports opening therethrough below the rotary valve 20 as shown in Figs. 3 and 4, and rigidly secured on the exhaust side of the said cylinder is a casting 26 shaped to afford one-half the bore for said rotary valve, and also having an opening therethrough below said valve for connection with the inlet 27, which opens into a chamber provided therefor in said casting fitting tightly thereagainst and a baffle plate 28 as shown in Fig. 3, extends upwardly at the bottom thereof, whereby the inlet mixture admitted through the pipe 27 is directed upwardly to the ports 25. As shown, the exhaust pipe 29 is connected to register with the exhaust ports on said side of the cylinder and to be controlled by said valve 20.

The inlet to the crank case through the ports 25 and the inlet to the cylinder through the inlet ports therefor are controlled by the piston as is usual in 2-cycle engines. Means are provided for timing the exhaust valve from the crank shaft to enable said engine to operate as a 2-cycle or 2-stroke engine, or for varying the operation of said exhaust valve to admit of operating said engine as a 4-stroke or 4-cycle engine. For this purpose, as shown, a pinion 30 is keyed on the crank shaft 3 and journaled on a stud shaft 31 are connected gear wheels 32 and 33, the one larger than the other, and the larger, 32, meshing with the pinion 30, and driven continuously thereby. At the side of the cylinder in axial alinement with the rotating valve 20 is a cylindric gear case 34 secured at the outer end of which is a gear casing comprising sections 35 and 36, and journaled therein is a shaft 37, the inner end of which is angular and slidable, but non-rotatably engages in a complemental bore in the end of the rotary valve 20. Rotatably secured on said shaft within the casing 35—36 are connected pinions 38, 39, of which the smaller, 38, meshes with the gear wheel 32, and the larger, 39, meshes with the smaller gear wheel 33. Said pinion 38 is of the same size as the pinion 30, to rotate the shaft 37, and consequently the rotary valve 20, once with each rotation of the crank shaft. The pinion 39 is sufficiently larger than the pinion 30 to afford a 2-to-1 drive, so that the shaft 37, and consequently said rotary valve, is rotated once for each two revolutions of the crank shaft, as is usual with 4-stroke or 4-cycle engines. The hubs of said pinions 38 and 39 are cast hollow to afford an interior chamber between said gear pinions 38 and 39, and rigidly secured on said shaft, and if preferred integrally, as shown in Figs. 5 and 13, is a double cam 40 having a peripheral notch therein adapted to engage the pin 41 within the pinion 39 or the pin 42 within the pinion 38, dependent upon the adjustment of said shaft inwardly or outwardly. When engaged on the pin 42 to bring the pinion 38 en train the shaft 37 is driven at the same rate as the engine shaft for two cycle operation, as before described. When engaged on the pin 41 to bring the pinion 39 en train the 2-to-1 drive is afforded for 4-stroke operation. Means are provided for sliding said shaft longitudinally in its bearings. For this purpose, as shown, a sleeve 43, is rigidly secured on the outer end of the section 36, and provided with obliquely arranged slots 44 therein extending for about 45 degrees of the periphery of said sleeve on each side thereof. Rotatable on the end of said shaft 37, but held from longitudinal movement thereon by a shoulder and nut on said shaft, is a collar 45ª, in which are secured the pins 45 which extend through said slots 44, and at their extremities into the internal longitudinal slots 46ª, in the rotary housing 46 which incloses said sleeve and the end of the shaft, and is secured on the outer face of the gear case section 36 by means of pins 47 which extend into segment shaped slots in the flange base thereof, so that rotation of said housing acts to slide said shaft by carrying said pins inwardly or outwardly along said sleeve. As shown, a handle or operating lever 48 is provided on said housing, and if preferred integrally, and a recess is provided therein adapted to contain a ball 49, and spring 50, affording a ball clutch, said spring acting to force said ball partly into suitable recesses therefor in the outer face of the gear casing.

For 2-cycle operation the spark should be retarded somewhat from the timing thereof for 4-cycle operation. This may conveniently be accomplished by means of the longitudinal movement of the shaft 37 before described. In Figs. 5 and 13, 51 indicates a spiral or worm gear comprising, as shown, a sleeve having suitable gear teeth on its periphery, and in the internally threaded ends of which are engaged threaded collars 52 and 53, which rotatably support said worm gear upon the shaft. Each of said collars is provided on its inner face with a pin, 54 and 55 respectively. Rigidly secured on the shaft 37 is a cam clutch member, 56, having recesses in the opposite sides thereof, arranged, as shown, a sufficient number of degrees apart to afford the necessary variation in the timing occasioned by the change from the 2-cycle to the 4-cycle type of engine. As shown, the face of the cam clutch member 56, adjacent each of the recesses therein, is inclined inwardly to admit of the respective pins at opposite ends of the worm gear to engage therein as the shaft is moved to its limit in either direction. The magneto, or timer shaft 57 is journaled transversely to the shaft 37, and is provided with a worm thereon 58 meshing with the worm gear 51 which drives the magneto or timer.

The operation is as follows: With the lever 48 adjusted as shown in Fig. 13, in which the 1-to-1 drive of the rotary valve and crank shaft is afforded, the engine operates as a 2-stroke engine, the exhaust valve being so adjusted as to open as shown in Fig. 3 as the piston reaches the limit of its power stroke, and to close at the end of the next succeeding or compression stroke, and preliminary to ignition. Of course when operating as a 2-cycle engine the rotary valve is of little importance, inasmuch as the piston may control the inlet ports and exhaust ports as is usual. When it is desired to operate the engine as a 4-cycle or 4-stroke engine, the lever 48 is actuated to rotate the housing 46, forcing the valve shaft 37 longitudinally, and disengaging the smaller pinion 38 from the cam clutch member 40, and engaging the pin 41 on the pinion 39, thereby thus driving the valve shaft at half its former rate, or, in other words, rotating the same once for each two rotations of the crank shaft, and simultaneously shifting the cam clutch 56 to vary or advance the timing for 4-cycle operation, as before described. The operation is now as follows: referring to Figs. 20 to 23 inclusive: Complete and immediate exhaust occurs with the opening of the rotary valve 20 at the end of the power stroke, followed by the inlet of the mixture, as shown in Fig. 20, the piston closing the exhaust ports and inlet ports and moving to compression position as shown in Fig. 21, the rotary valve meanwhile continuing its rotation, closing the exhaust passages, and being in position to maintain the exhaust passages closed at the return of second intake stroke indicated in Fig. 22. Obviously, a fresh charge of the explosive mixture was admitted to the crank case with the first compression stroke indicated in Fig. 21, and consequently an additional charge of the mixture is admitted at the end of the second intake stroke as shown in Fig. 22, thus affording within the cylinder a much larger amount of the fuel mixture than was contained therein at the first compression. The piston then returns to final compression position as shown in Fig. 23, and the ignition occurs as is usual with 4-cycle engines, returning the piston to the end of the power stroke or full exhaust position, as indicated at 20. With this adjustment the rotary valve serves only to retain such compression within the cylinder as may have been afforded by the initial inlet from the crank case, and as the piston moves to final compression position, as shown in Fig. 23, said valve opens to permit full exhaust at the end of the power stroke. Material increase in efficiency is attained over 2-cycle engines by the additional compression attained thereby.

From the construction described it is obvious that the engine may be changed instantly and without stopping from the 2-cycle to the 4-cycle type, by the operation of a single lever, the timing of the ignition and the valve being accomplished simultaneously. The vaporizer and mixer afforded by the corrugated plates 23 before described insures a perfect mixture and complete vaporization of the hydrocarbon of the charge, inasmuch as the arrangement of said plates affords a plurality of small passages through which the charge is forced, said plates being of a higher temperature than the charge facilitate such complete vaporization and mixture. Said device serves a further and very important function in that the spray of the lubricant in the crank case carried upwardly by the mixture and through the inclined passages between the plates is collected in said restricted passages and flows downwardly therefrom and laterally through passages 59 to the crank shaft bearings to lubricate the same as indicated in Figs. 6 and 7.

While we have shown a rotary valve as controlling the exhaust ports of the engine, it is to be understood of course that other valves may be employed if desired, and in Figs. 24 to 26 inclusive we have illustrated in the drawings the use of a slide valve for this purpose, and in Figs. 27 and 28 thereof a sleeve valve.

Referring to the slide valve construction, the shaft 37 is extended transversely of the cylinder, and provided with an eccentric 60, the eccentric yoke 61 of which is provided with an arm 62 which pivotally engages a suitable boss 63 on the slide valve 64, which is adapted to cover the exhaust port, operating in all particulars, so far as the control of said exhaust ports is concerned, as the rotary valve before described. As shown, said slide valve is cored on its inner side, or that adjacent the cylinder, to permit the inlet port to the crank case to remain normally open, except as controlled by the piston. As shown also, said slide valve is engaged on its outer face by portions of the manifold casing which affords an outer guide therefor.

In the construction illustrated in Figs. 27 and 28, a sleeve 65 incloses and slides upon the lower end of the cylinder, and a toggle arm 66 is pivotally engaged on the boss 63 on said sleeve, which projects therefrom into the inlet casing and below the exhaust manifold. The outer end of said toggle arm is provided with a transverse or T-shaped cylindric head 67 which engages in a suitable recess therefor in the opposite wall of the inlet chamber from the manifold, as shown in Figs. 27 and 28, and the arm 62 of the eccentric yoke engages said toggle arm 66 intermediate its ends so that the rotation of the shaft 37 acts to reciprocate said sleeve on the cylinder. Said sleeve at the exhaust side of the engine is extended longitudinally of the cylinder to provide an imperforate or unported web or valve closure whereby the exhaust ports from the cylinder are entirely closed when the valve is at the position shown in Fig. 27, at which time, however, the inlet ports to the cylinder are fully open, inasmuch as said sleeve on the inlet side of the cylinder is cut away or shortened, so that the inlet ports are never covered or closed thereby. As shown also ports are provided peripherally around said sleeve to register with the inlet ports through said cylinder and into the crank case, and the side of the cylinder is peripherally recessed below said ports to permit said ports to remain normally open (except for the piston) at any position of said sleeve. The operation is of course as above described.

We have shown but a preferred construction embodying our invention. Although numerous details of construction and operation may be varied, we therefore do not purpose limiting the patent granted on this application otherwise than necessitated by the prior art.

We claim as our invention:

1. A 2-stroke cycle engine embracing a cylinder, a crank case attached thereto, an exhaust valve and ignition means timed for 2-stroke operation of said engine, means simultaneously adjusting the timing of said valve and said ignition means to cause 4-stroke cycle operation of said engine, and means associated with said crank case for introducing a double fuel charge under compression into said cylinder when operating as a 4-stroke engine.

2. A 2-stroke cycle engine embracing a cylinder, a piston, a crank case, a by-pass connecting said crank case with said cylinder, vaporizing and mixing mechanism for a fuel charge within said by-pass, igniting means, an exhaust controlling valve, lever actuated means simultaneously adjusting said exhaust controlling valve, and the timing of said ignition means for 4-stroke cycle operation, and mechanism permitting inlet of two fuel charges prior to ignition for each 4-stroke cycle power stroke.

3. A 2-stroke cycle engine embracing a cylinder, a crank case, a valve controlling the outlet from the cylinder, timed ignition means, means compressing the charge prior to inlet to the cylinder, manually operated means for varying the timing of said ignition means to convert the engine from a 2-stroke to a 4-stroke motor, and vice versa, without stopping the motor, and mechanism for adjusting said valve and ignition means to permit a second fuel charge inlet prior to ignition when operating as a 4-stroke cycle engine.

4. An internal combustion two stroke cycle engine comprising a cylinder, a piston, means changing the cycle of said engine without stopping from two stroke to four stroke cycle and vice versa, and mechanism permitting an additional fuel mixture to pass into said cylinder for one cycle when operating as a four stroke cycle engine.

5. In a convertible 2-stroke or 4-stroke cycle internal combustion engine of the 2-stroke type, a cylinder, a crank case attached thereto having a by-pass communicating with said cylinder, plates in said by-pass for vaporizing and mixing a fuel charge, a valve mechanically operated to retain a first fuel charge in the cylinder while a second fuel charge flows thereinto, means compressing the second fuel charge in said crank case prior to inlet to the cylinder, and preliminary to final compression, ignition means, and manually operated mechanism for timing the same according to the operation of said valve.

6. In a 2-stroke cycle internal combustion engine embracing the cylinder, having peripherally arranged inlet and exhaust ports near the lower end thereof, and a reciprocating piston therein normally controlling said ports, a crank case, means admitting the fuel charge thereinto for preliminary compression, a passage connecting said crank case with the inlet ports, timed ignition means, a mechanically operated valve adapted to alternately close and open the exhaust ports when the inlet ports are open during 4-stroke operation, and remaining open continuously during 2-stroke operation, and manually operated means for simultaneously varying the timing of said valve and ignition means to convert the engine from 2-stroke to 4-stroke cycle of operation, and vice versa, without stopping the engine.

7. In a normally 2-stroke cycle internal combustion engine, ignition means, a valve adapted to change the cycle of said engine without stopping from 2-stroke to 4-stroke cycle and vice-versa, means for shifting the timing of said ignition means for 4-stroke operation of the engine, and mechanism for causing operation of said valve to permit delivery therethrough into the engine of a double charge of fuel mixture for each ignition when operating as a 4-stroke cycle engine.

8. In a device of the class described, a cylinder, a crank case having a by-pass therein for admitting fuel from the crank case into said cylinder, a fuel vaporizing and mixing mechanism within said by-pass, a valve, ignition means, timing mechanisms for said valve and means, a shaft constantly rotating synchronously with the crank shaft and operating said timing mechanisms, a clutch adapted for manual actuation and acting to shift said timing mechanisms from 1-to-1 to 2-to-1 operation, and vice-versa, and to vary the timing of the ignition means corresponding for 2-stroke and 4-stroke operation respectively.

9. In an engine of the class described, a cylinder, a crank case for introducing a fuel charge thereinto under pressure, means between said cylinder and crank case for vaporizing and mixing said fuel charge, a lever, clutch mechanism connected therewith, two sets of timing gears connected with said clutch mechanism, both adapted to be *en train* with the crank shaft, and affording respectively a 1-to-1 and a 2-to-1 operation, igniting mechanism operatably connected to said timing gears, and a valve operated from said timing gears, said lever adapted to be actuated to shift said clutch mechanism causing a shifting of the timing gears which simultaneously drive said igniting mechanism and said valve to change the timing thereof to cause a change in the cycle of operation of the engine.

10. In an engine of the class described a cylinder having inlet and outlet ports therein, a piston movable in the cylinder controlling the opening and closing of said ports, a valve controlling the flow from said outlet ports, ignition means, and mechanism changing the timing of said ignition means and the speed of rotation of said valve to permit said engine to operate both on two cycle and four cycle principles.

11. In an engine of the class described a cylinder having inlet and outlet ports therein, a piston moving in said cylinder adapted to control the opening and closing of said ports, a valve operated synchronously with said engine to control the flow from the outlet ports of said cylinder, ignition means, and mechanism operating to change the timing of said ignition means and simultaneously disconnect said valve from driving engagement with the engine to cause a change in the cycle of operation of the engine.

12. In an engine of the class described a cylinder having a plurality of inlet and outlet ports therein, a piston movable in the cylinder to control the opening of said inlet and outlet ports to permit a flow of fuel beneath the piston, and thereafter above the piston into the cylinder, a rotatable valve controlling the flow from said outlet ports of the cylinder, driving connections between said engine and said valve to cause said valve to operate synchronously therewith and means disconnecting said driving connections to allow said valve to maintain an open position and at rest.

In testimony whereof we have hereunto subscribed our names in the presence of two subscribing witnesses.

ALBERT E. COOK.
THOMAS VAN TUYL.

Witnesses:
ANNA B. HILLS,
CHARLES W. HILLS, Jr.